United States Patent
Chung et al.

(10) Patent No.: US 9,043,733 B2
(45) Date of Patent: May 26, 2015

(54) WEIGHTED N-FINGER SCALING AND SCROLLING

(71) Applicant: Google Inc., Mountain View, CA (US)

(72) Inventors: Winson Chung, Palo Alto, CA (US); Adam William Powell, Mountain View, CA (US); Svetoslav Ganov, Mountain View, CA (US); Michael Adam Cohen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 3 days.

(21) Appl. No.: 13/839,210

(22) Filed: Mar. 15, 2013

(65) Prior Publication Data

US 2014/0082570 A1 Mar. 20, 2014

Related U.S. Application Data

(60) Provisional application No. 61/703,664, filed on Sep. 20, 2012.

(51) Int. Cl.
*G06F 3/033* (2013.01)
*G06F 3/01* (2006.01)
*G06F 3/0488* (2013.01)
*G06F 3/0485* (2013.01)

(52) U.S. Cl.
CPC .............. *G06F 3/017* (2013.01); *G06F 3/0488* (2013.01); *G06F 3/0485* (2013.01); *G06F 2203/04806* (2013.01); *G06F 2203/04808* (2013.01)

(58) Field of Classification Search
CPC ......... G06F 3/01; G06F 3/0486; G06F 3/488; G06F 3/4883; G06F 3/14; G06F 3/018; G06F 3/0237; G06F 3/03; G06F 3/041
See application file for complete search history.

(56) References Cited

U.S. PATENT DOCUMENTS

| 2006/0026535 | A1 | 2/2006 | Hotelling et al. |
| 2010/0162181 | A1* | 6/2010 | Shiplacoff et al. ............ 715/863 |
| 2010/0309147 | A1 | 12/2010 | Fleizach et al. |
| 2011/0072394 | A1 | 3/2011 | Victor |
| 2012/0159402 | A1 | 6/2012 | Nurmi et al. |
| 2012/0169774 | A1 | 7/2012 | Yu |
| 2012/0192116 | A1 | 7/2012 | Stedman et al. |
| 2013/0085847 | A1* | 4/2013 | Dyor et al. ................. 705/14.49 |

OTHER PUBLICATIONS

International Search Report and Written Opinion of international application No. PCT/US2013/059452, dated Dec. 20, 2013, 12 pp.
International Preliminary Report on Patentability from international application No. PCT/US2013/059452, dated Apr. 2, 2015, 9 pgs.

* cited by examiner

*Primary Examiner* — Boris Pesin
*Assistant Examiner* — Ayesha Huertas Torres
(74) *Attorney, Agent, or Firm* — Shumaker & Sieffert, P.A.

(57) ABSTRACT

In one example, a method includes receiving an indication of an input gesture detected at a presence-sensitive input device, where the input gesture includes one or more input points and each input point is detected at a respective location of the presence-sensitive input device. The method may also include determining a focal point of the input gesture, and determining a radius length. The method may also include determining a shape centered at the focal point and having a size determined based on the radius length. The method may also include responding to a change in a geometric property of the shape by scaling information included in a graphical user interface, where the scaling of the information being centered at the focal point.

20 Claims, 11 Drawing Sheets

WEIGHTED N-FINGER SCALING AND SCROLLING

RELATED APPLICATIONS

This application claims the benefit of U.S. Provisional Patent Application No. 61/703,664, filed Sep. 20, 2012, the entire content of which is incorporated herein by reference.

BACKGROUND

Some computing devices (e.g., mobile phones, tablet computers) may receive user input that is entered at a presence-sensitive input device. For instance, a presence-sensitive input device may output a graphical (or "soft") keyboard that permits the user to enter data by tapping and/or gesturing over graphical elements (e.g., keys) displayed at the presence-sensitive input device. In other examples, a presence-sensitive input device may output a graphical user interface (e.g., an interface of a game or an operating system) that permits the user to enter commands by tapping and/or gesturing over other graphical elements (e.g., buttons, scroll bars) displayed at the presence-sensitive input device. After receiving user input, such as in input gesture, the computing device may modify the execution of processes, the storage of data, and/or aspects of the GUI output at the computing device display. In some examples, the device may increase (scale-up) or decrease (scale-down) the size of information displayed at a presence-sensitive display based on the one or more received input gestures.

SUMMARY

In one example, a method includes receiving, by a computing device, an indication of an input gesture detected at a presence-sensitive input device operatively coupled to the computing device, where the input gesture includes one or more input points, and each input point is detected at a respective location of the presence-sensitive input device. The method may also include determining, by the computing device and based on an average of coordinates of each of the respective locations, a focal point of the input gesture. The method may further include determining, by the computing device and based on an average distance between the focal point and each of the respective locations, a radius length. The method may also include determining, by the computing device, a shape substantially centered at the focal point and having a size determined based on the radius length. The method may further include responding to a determination that a geometric property of the shape has changed by outputting, to the presence-sensitive input device, a scaling of information included in a graphical user interface displayed at the input device, the scaling being based on the change in the geometric property and centered at the focal point.

In one example, a method includes receiving, by a computing device, an indication of an input gesture detected at a presence-sensitive input device operatively coupled to the computing device, where the input gesture includes one or more input points, and each input point is detected at a respective location of the presence-sensitive input device. The method may also include determining, by the computing device and based on an average of coordinates of each of the respective locations, a focal point of the input gesture. The method may further include determining, by the computing device, a polygon shape substantially centered at the focal point and having a size determined based on the respective locations. The method may also include responding to determining that a geometric property of the polygon shape has changed by, outputting to the presence-sensitive input device, a scaling of information included in a graphical user interface displayed at the input device, the scaling being based on the change in the geometric property and centered at the focal point.

The details of one or more embodiments of the disclosure are set forth in the accompanying drawings and the description below. Other features, objects, and advantages of the will be apparent from the description and drawings, and from the claims.

DETAILED DESCRIPTION

Figure 1:
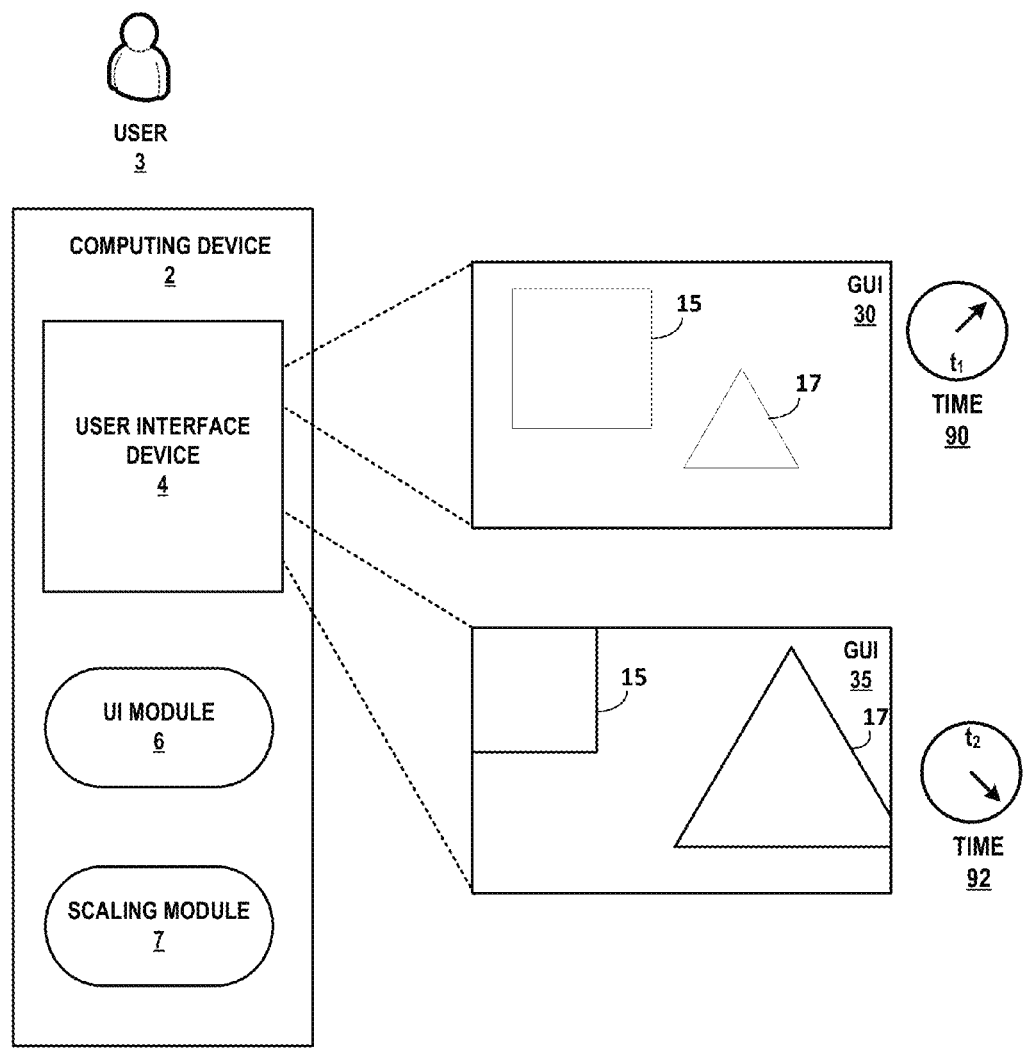
FIG. 1 is a conceptual diagram illustrating an example computing for scaling information displayed on a user interface device of a computing device, in accordance with one or more techniques of the present disclosure.

In general, this disclosure is directed to techniques for processing multi-touch gestures detected by a presence-sensitive input device. Various presence-sensitive input devices may only provide information about a predetermined number of the most recently detected inputs to a computing device operatively coupled to the presence-sensitive input devices even when more than the predetermined number of inputs are positioned at or near the presence-sensitive input devices. For example, a presence-sensitive input device may initially detect a predetermined number of inputs, such as two or three for example, and output information about the location and movement of those inputs to the computing device. Subsequent to detecting the predetermined number of inputs, a presence-sensitive input device may detect another input. Responsive to detecting this additional input, a presence-sensitive input device may cease outputting information about the first of the predetermined inputs detected by the presence-sensitive input device and start outputting information about the newly detected input. If the new input sufficiently differs in location from the first input, the computing device may determine that the change in location corresponds to an input gesture and take an action based on the input gesture, such as outputting a modified graphical user interface (GUI) for display at a display or a presence-sensitive input device operatively coupled to the computing device. That is, in such scenarios, the computing device may incorrectly determine that the movement corresponds to an input gesture and may cause unintended and undesirable changes to the GUI.

Techniques of the present disclosure may reduce these unintended and undesired changes to a GUI by at least configuring a computing device to process information about all inputs detected by a presence-sensitive input device operatively coupled thereto. According to some techniques of the present disclosure, the computing device may determine a focal point located generally between all of the input points by determining an average location (e.g., mean coordinate value(s)) of all inputs received during a defined unit of time. Responsive to determining the focal point, the computing device may determine a circular or polygon shape centered generally on the focal point and a geometric property of the circular or polygon shape. As the computing device receives information indicating that the locations of current input points is changing (such as during an input gesture), the computing device may determine updated focal points, updated circular or polygon shapes, and/or updated geometric properties. In such instances, the computing device may update a GUI by, for example, outputting displayed information scaled in response to changing geometric properties, or by outputting the displayed information such that it scrolls in response to a change in focal point location. Accordingly, the techniques of the present disclosure may enable a computing device to more smoothly and accurately scale and scroll displayed information included in a GUI by at least processing all inputs detected by a presence-sensitive input device operatively coupled to the computing device.

FIG. 1 is a conceptual diagram illustrating an example computing device for scaling information displayed on a user interface device of a computing device, in accordance with one or more techniques of the present disclosure. In some examples, computing device 2 may be associated with a user 3. User 3 associated with computing device 2 may interact with computing device 2 by providing various inputs to computing device 2. In some examples, user 3 may have one or more accounts with one or more services, such as a social networking service and/or telephone service, and the accounts may be registered with computing device 2, which is associated with user 3.

Examples of computing device 2 may include, but are not limited to, portable or mobile devices such as mobile phones (including smart phones), laptop computers, desktop computers, tablet computers, smart television platform, personal digital assistants (PDAs), servers, mainframes, etc. As shown in FIG. 1, computing device 2, in some examples, can include user interface (UI) device 4, UI module 6, and scaling module 7. Other examples of computing device 2 that implement techniques of the disclosure may include additional components not shown in FIG. 1.

Computing device 2 may include UI device 4. In some examples, UI device 4 is configured to receive tactile, audio, or visual input. Examples of UI device 4 may include a touch-sensitive and/or a presence-sensitive input device or any other type of device for receiving input. UI device 4 may output content such as graphical user interface (GUI) 30 and GUI 35 for display. In the example of FIG. 1, UI device 4 may be a presence-sensitive input device that can display a graphical user interface and receive input from a user using capacitive or inductive detection at or near the presence-sensitive device.

In FIG. 1, GUIs 30 and 35 depict GUIs comprising two example geometric objects 15 and 17. GUI 30 illustrates displayed example objects 15 and 17 at a first size, and reference numeral 90 indicates that UI device 4 may display objects 15 and 17 at a first time, $t_1$. GUI 35 illustrates displayed example objects 15 and 17 at a second size, and reference numeral 92 indicates that UI device 4 may display objects 15 and 17 at a second time, $t_2$.

As shown in FIG. 1, computing device 2 may also include user interface (UI) module 6 and scaling module 7. UI module 6 may perform one or more functions to receive input, such as user input or network data, and send such input to other components associated with computing device 2, such as scaling module 7 or other various modules. UI module 6 may also receive data from components associated with computing device 2, such as scaling module 7 or other various modules. In response to received data, UI module 6 may cause other components associated with computing device 2, such as UI device 4, to provide output based on the data. In some examples, UI module 6 may receive user input in the form of an input gesture. After receiving an indication of an input gesture, UI module 6 may output information to scaling module 7 and other various modules of computing device 2. Based on the received information, scaling module 7 may, in some examples, operate to scale information displayed in a GUI by a computing device. Scaling module 7 may then output the scaled information to other modules of computing device 2, such as UI module, UI device 4, or other modules.

In the example of FIG. 1, UI device 4 may display GUI 30 and example objects 15 and 17 at a first time, $t_1$. At a later point, UI module 6 may receive a scaling input gesture from user 3 indicating a command to scale up the displayed objects 15 and 17. UI module 6 may output the received input to scaling module 7, and scaling module 7 may perform a scaling function on the information displayed by GUI 30. Scaling module 7 may then output the scaled information. Upon receiving the scaled information, either directly from scaling module 7, from UI module 6, or from some other module associated with computing device 2, UI device 4 may display a second GUI, GUI 35, displaying scaled objects 15 and 17 at a later time, $t_2$.

Figure 2:
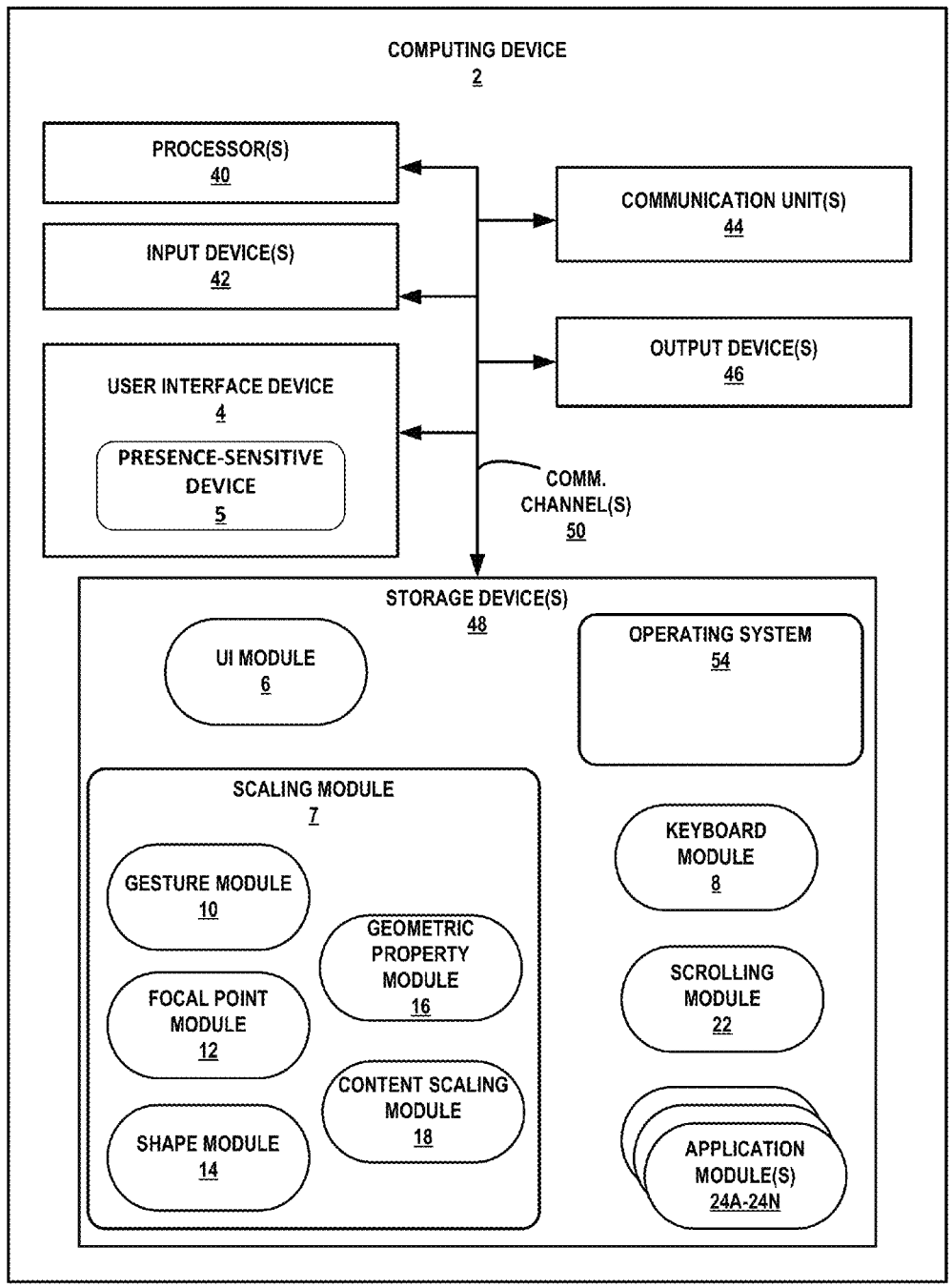
FIG. 2 is a block diagram illustrating further details of the example computing device of FIG. 1, in accordance with one or more aspects of the present disclosure.

FIG. 2 is a block diagram illustrating further details of the example computing device of FIG. 1, in accordance with one or more aspects of the present disclosure. FIG. 2 illustrates only one particular example of computing device 2, and many other examples of computing device 2 may be used in other instances. Although shown in FIG. 2 as a stand-alone computing device 2 for purposes of example, a computing-device may be any component or system that includes a processor 40 or other suitable computing environment for executing software instructions and, for example, need not include presence-sensitive input device 5.

As shown in the specific example of FIG. 2, computing device 2 includes one or more processors 40, one or more input devices 42, one or more communication units 44, one or more output devices 46, one or more storage devices 48, and user interface (UI) device 4. Computing device 2, in one example, further includes operating system 54 that is executable by computing device 2. Each of components 40, 42, 44, 46, and 48 may be interconnected (physically, communicatively, and/or operatively) for inter-component communications. As one example in FIG. 2, components 40, 42, 44, 46, and 48 may be coupled by one or more communication channels 50. In some examples, communication channels 50 may include a system bus, network connection, interprocess communication data structure, or any other channel for communicating data. Modules 6, 7, 8, 10, 12, 14, 16, 18, 22, and 24A-24N and operating system 54 may also communicate information with one another as well as with other components associated with computing device 2.

Processors 40, in one example, are configured to implement functionality and/or process instructions for execution within computing device 2. For example, processors 40 may be capable of processing instructions stored in storage device 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 2 during operation. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 2 (e.g., modules 6, 7, 8, 10, 12, 14, 16, 18, 22, and 24A-24N and operating system 54) to temporarily store information during program execution.

Storage devices 48, in some examples, also include one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 44. Computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes communication unit 44 to wirelessly communicate with an external device such as computing devices 4 of FIG. 1, or any other computing device.

Computing device 2, in at least one example, also includes one or more input devices 42. Input device 42, in some examples, is configured to receive input from a user through tactile, audio, or video feedback. Examples of input device 42 include a presence-sensitive input device, a mouse, a keyboard, a voice responsive system, video camera, microphone or any other type of device for detecting a command from a user. In some examples, a presence-sensitive input device may also include a touch-sensitive screen.

One or more output devices 46 may also be included in computing device 2. Output device 46, in some examples, is configured to provide output to a user using tactile, audio, or video stimuli. Output device 46, in one example, includes a presence-sensitive input device, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user. In some examples, UI device 4 may include functionality of input device 42 and/or output device 46. In the example of FIG. 2, UI device 6 may be a touch-sensitive screen.

Computing device 2 may include operating system 54. Operating system 54, in some examples, controls the operation of components of computing device 2. For example, operating system 54, in one example, facilitates the communication of modules 6, 7, 8, 10, 12, 14, 16, 18, 22, and 24A-24N with processors 40, communication unit 44, storage device 48, input device 42, and output device 46. The modules 6, 7, 8, 10, 12, 14, 16, 18, 22, and 24A-24N may each include program instructions and/or data that are executable by computing device 2. As one example, UI module 6 may include instructions that cause computing device 2 to perform one or more of the operations and actions described in the present disclosure. In other examples, various hardware elements may implement UI module 6, scaling module 7, keyboard module 8, gesture module 10, focal point module 12, shape module 14, geometric property module 16, content scaling module 18, scrolling module 22, and other applications modules 24A-24N. In still other examples, a combination of hardware elements and program instructions may implement modules 6, 7, 8, 10, 12, 14, 16, 18, 22, and 24A-24N.

Computing device 2, in some examples, includes keyboard module 8. Keyboard module 8 may include functionality to receive and transfer input data associated with input from a keyboard associated with computing device 2. For instance, keyboard module 8 may include hardware components, such as a physical keyboard attached to computing device 2, software components, such as a software-implemented keyboard displayed in a GUI, or a combination of the two. Keyboard module 8 may receive input data from the associated hardware and/or software components. Keyboard module 8 may also output the received data to any of the other component associated with computing device 2, such as modules 6, 7, 8, 10, 12, 14, 16, 18, or other application module(s) 24A-24N.

In some examples, computing device 2 includes one or more application modules 24A-24N. Application modules 24A-24N may include functionality to perform any variety of operations on computing device 2. For instance, application modules 24A-24N may include a word processor, spreadsheet, web browser, multimedia player, server application, operating system, distributed computing application, graphic design application, video editing application, web development application, etc. As described in the example of FIG. 1, application modules 24A-24N may include functionality of a graphic design application that displays graphical content including graphical objects. Application modules 24A-24N may further enable user 3 to create and modify graphical content in response to receiving user inputs via UI device 4. For example, modules 6, 7, 8, 10, 12, 14, 16, 18, and/or other application module(s) 24A-24N may cause UI device 4 to display graphical objects, such as objects 15 and 17 (shown in FIG. 1). In response to receiving user input, application modules 24A-24N may create and or modify graphical content included in GUIs 30 and/or 35.

In accordance with techniques of the disclosure, modules 6, 7, 8, 10, 12, 14, 16, 18, 22, and/or other application module(s) 24A-24N may initially cause UI device 4 to display a graphical user interface that includes graphical objects, such as GUI 30 shown in FIG. 1. In accordance with techniques of the disclosure, user 3 may perform an input gesture at a location of UI device 4 that displays graphical objects 15 and 17. UI device 4 may detect the input gesture and, in response, UI module 6 may determine whether the input gesture is a scaling or scrolling input gesture. If the input gesture is not a scaling or scrolling input gesture, UI module 6 may ignore the input gesture or perform a different operation that is not related the techniques of this disclosure. If, however, the input gesture is a scaling or scrolling input gesture, UI module 6 may cause UI device 4 to display graphical content, such as graphical objects 15 and 17, at an increased size or at a different location on UI device 4 corresponding to the input gesture.

In some examples, UI module 6 may display GUIs generated by application modules 24A-24N or other modules 6, 7, 8, 10, 12, 14, 16, 18, or 22 that allow user 3 to interact with computing device 2. Example GUIs may include information. Information, generally, may be text or graphical content or any output of UI device 4. Graphical content, for example, may be any visually displayable graphical object of a graphical user interface. Examples of graphical content may include shapes, images, a group of moving images, etc. Such examples may include a picture, hyperlink, animation, video, characters of a character set, etc. UI module 6 may cause UI device 4 to display such graphical content in accordance with techniques of the present disclosure further described herein.

Techniques of the present disclosure may improve the ease with which a user can change the size and/or location of graphical content displayed in a GUI. Using techniques of the disclosure, a user may perform an input gesture at or near UI device 4 of computing device 2 in order to scale and/or scroll displayed graphical content. In one example, a user 3 may perform an input gesture using three inputs. In another example, a user may perform an input gesture using four inputs. In still another example, a user may perform an input gesture using only a single input. According to one or more of the techniques described in the present disclosure, an input gesture sufficient to cause computing device 2 to perform a scaling and/or scrolling action may comprise any number of inputs greater than zero.

As shown in FIG. 2, computing device 2, in some examples, may include scaling module 7. As discussed previously, scaling module 7 may operate to scale content displayed in GUIs by UI device 4. Scaling module 7 may be further broken down in other modules, for example, modules 10, 12, 14, 16, and 18. Accordingly, in some examples, computing device 2 may include a gesture module 10. Gesture module 10 may receive data associated with input points. For example, UI device 4 may detect input points associated with inputs and send the data to gesture module 10. In some examples, a single input point may be associated with each input. In other examples, multiple input points may be associated with each input. Gesture module 10 may determine a coordinate location for each input point. In some examples, gesture module 10 may also determine a time associated with each coordinate location of each input point. For example, a first input point location $(x_1, y_1)$ may be associated with time $t_1$. A second input point location $(x_2, y_2)$ may be associated with a time $t_2$. In some instances, times $t_1$ and $t_2$ may be the same time if the first and second input point locations were determined simultaneously. In other examples, times $t_1$ and $t_2$ may be different if the first and second input point locations were not determined simultaneously. In at least one example, gesture module 10 may determine the locations of input points every one-one-hundredth of a second. Other gesture modules 10 may allow less or more time between determining the locations of any input points, such as between $1 \times 10^{-1}$ to $1 \times 10^{-12}$ seconds. In still other examples, gesture module 10 may determine the location of any input points substantially continuously. Gesture module 10 may further output the input point coordinate locations and times associated with each input point to any of other various modules 6, 7, 8, 12, 14, 16, 18, 22, or other application module(s) 24A-24N, or any other component of computing device 2.

As shown in FIG. 2, computing device 2 may also include focal point module 12. Focal point module 12 may receive data from gesture module 10 or any other component of computing device 2. For example, focal point module 12 may receive the input point coordinate locations and times associated with each input point. In some examples, focal point module 12 may determine a coordinate location of one or more focal points of all of the input points. Similarly to gesture module 10, in some examples, focal point module 12 may also associate a time with each focal point. The determined coordinate location of a focal point may be the average of each of the coordinate locations of the input points associated with the same time or times within a certain range. In this manner, focal point module 12 may determine the coordinate location of multiple focal points with each focal point associated with a time or time range. Focal point module 12 may also include components allowing focal point module 12 to output information associated with a determined focal point or points to any other components of computing device 2, such as various modules 6, 7, 8, 10, 14, 16, 18, 22 or other application module(s) 24A-24N.

In some examples, computing device 2 may also include shape module 14. In at least one example, shape module 14 may receive data from focal point module 14, gesture module 10, or any of various modules 6, 7, 8, 10, 12, 16, 18, 22, other application module(s) 24A-24N or any other component of computing device 2. For example, shape module 14 may receive input point coordinate locations and times associated with each input point and data associated with one or more focal points. For each time or time range, in some examples, shape module 14 may determine a radius length. Similarly to other example modules described previously, shape module 14 may also associate a time with each radius length. In at least one example, the radius length may be the average of the distances between the between a focal point and each input point associated with a particular time or time range. In other examples, the radius length may be the largest distance between a focal point and an input point. Shape module 14 may also determine a circular shape associated with each time or time range. Each circular shape may be generally centered on the focal point associated with the same time or time range. In some examples, the circular shapes have a diameter that is twice the determined radius length. In other examples, for each time or time range, shape module 14 may determine a polygon shape bounded by each input point. As with other components of computing device 2, shape module 14 may include components allowing the module to output data to any other component of computing device 2.

As shown in FIG. 2, at least one example of computing device 2 may include geometric property module 16. In some examples, geometric property module 16 may receive data from any other component of computing device 2. For example, geometric module 16 may receive data such as input point coordinate locations and times associated with each input point and/or data associated with one or more focal points, radius lengths, circular shapes, polygon shapes, or any other data associated with computing device 2. Geometric property module 16 may determine various geometric properties of the received determined circular or determined polygon shapes. Some example geometric properties include the circumference, area, or diameter of determined circular shapes. Other examples include the area of determined polygon shapes, the square root of the area of the polygon shape, or the linear distance of the sum each side of determined polygon shapes. Further, in at least one example, geometric property module 16 includes components with allow the module to output data to any other component of computing device 2 such as various modules 6, 7, 8, 10, 12, 14, 18, 22, or other application module(s) 24A-24N.

In some examples, computing device 2 may include content scaling module 18. Content scaling module 18 may receive data from any other component of computing device 2. For example, content scaling module 18 may receive data such as input point coordinate locations and times associated with each input point and/or data associated with one or more focal points, radius lengths, circular shapes, polygon shapes, geometric properties associated with circular or polygon shapes, or any other data associated with computing device 2. In at least one example, content scaling module 18 may scale graphical content (i.e. zoom-in or zoom-out on the displayed graphical content) displayed in a GUI, for example GUI 30 or 35. In some examples, content scaling module 18 may determine differences in geometric properties of circular or polygon shapes associated with different times or time ranges. Content scaling module 18 may then scale the displayed graphical content in response to determining differences in geometric properties associated with different times or time ranges. In some examples, content scaling module 18 may only scale displayed graphical content if the difference in geometric properties is larger than a threshold. In at least one example, content scaling module 18 may scale the graphical content in a linear relation to the determined differences in geometric properties. In other examples, content scaling module 18 may scale the displayed in a non-linear relation to the determined differences in geometric properties. In still other examples, content scaling module 18 may scale displayed graphical content in a linear or a non-linear relation to determined differences in geometric properties based on other data. In at least one example, content scaling module 18 may center the scaling of the graphical content on the location of a focal point. As with other components of computing device 2, content scaling module 18 may include components allowing the module to output data to any other component of computing device 2.

As shown in FIG. 2, computing device 2 may include scrolling module 22. Scrolling module 22 may receive data such as input point coordinate locations and times associated with each input point and/or data associated with one or more focal points, radius lengths, circular shapes, polygon shapes, geometric properties associated with circular or polygon shapes, or any other data associated with computing device 2. In some examples, scrolling module 22 may determine a difference in coordinate locations of two or more focal points. Scrolling module 22 may also, in response to determining a difference in coordinate locations of two or more focal points, scroll the graphical content displayed by UI device 4. For example, scrolling module 22 may scroll the displayed graphical content in the direction of the change in coordinate locations of one or more focal points. In some examples, scrolling module 22 may scroll the content in a linear relation to determined differences in the coordinate locations. Scrolling module 22 may also scroll the content in a non-linear relation to the determined differences in the coordinate locations. In some examples, scrolling module 22 may scroll the displayed graphical content at the same time content scaling module 18 scales the displayed graphical content. As with other components of computing device 2, scrolling module 22 may include components allowing the module to output data to any other component of computing device 2.

In other examples, computing device 2, which may be used to display graphical content and improve the ease of scaling and scrolling graphical content, in accordance with one or more techniques of the present disclosure, may include more or fewer modules. For example, the functions of the various modules 6, 7, 8, 10, 12, 14, 16, 18, 22, and other application module(s) 24A-24N may be combined into fewer modules, or even a single module. Conversely, in other examples, computing device 2 may spread out the functions of various modules 6, 7, 8, 10, 12, 14, 16, 18, 22, and other application module(s) 24A-24N over an even greater number of modules.

FIG. 1 illustrates an example result of the techniques of the present disclosure. FIG. 1 illustrates an example GUI display at two separate times, $t_1$ and $t_2$. Combining the functions of the previously described modules 6, 7, 8, 10, 12, 14, 16, 18, 22, and/or other application module(s) 24A-24N, in accordance with the techniques of the present disclosure, may cause UI device 4 to display graphical user interface (GUI) 30 including graphical objects 15 and 17 displayed at a first size at a first time 90, $t_1$. Consequently, in response to an input gesture, for example, modules 6, 7, 8, 10, 12, 14, 16, 18, and/or other application module(s) 24A-24N may cause UI device 4 to scale-up graphical objects 15 and 17 of UI device 4. GUI 35 displays graphical objects 15 and 17 at a second time 92, $t_2$.

Figure 3:
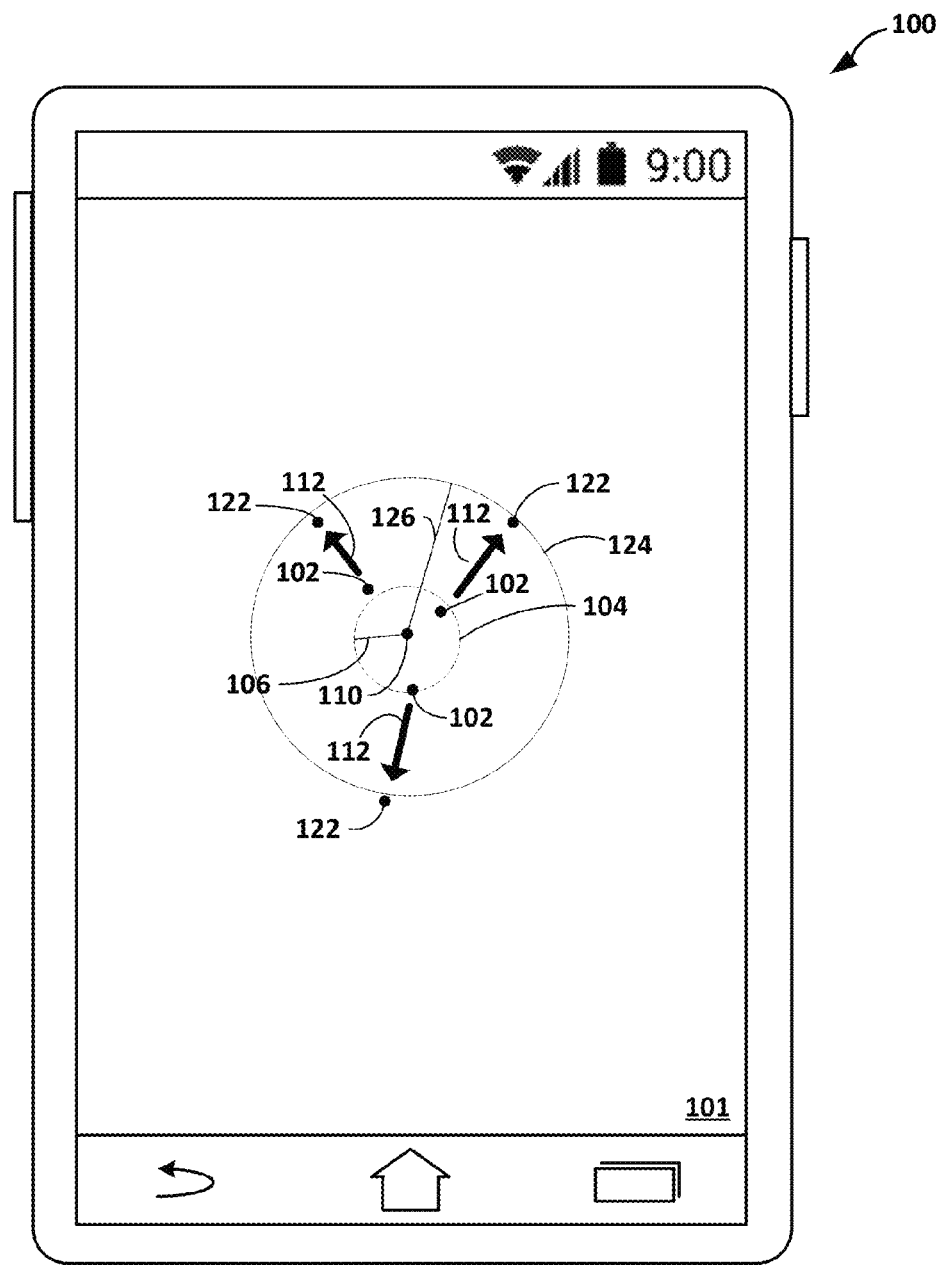
FIG. 3 is a conceptual diagram illustrating an example user interface that includes inputs for scaling information, in accordance with one or more aspects of the present disclosure.

FIG. 3 is a conceptual diagram illustrating an example user interface that includes inputs for scaling information, in accordance with one or more aspects of the present disclosure. FIG. 3 also illustrates example input points, such as input points 102 and 122 associated with a scaling input gesture. When an example user 3 performs a scaling input gesture, the user may place a number of inputs near or in contact with display 101. User 3 may then perform an input gesture by moving the inputs away from each other in an expanding motion.

FIG. 3 illustrates an example scale-up input gesture using three inputs. Computing device 100 may associate input points 102 and 122 with the inputs involved in the scaling input gesture. As described previously, input points 102 may be associated with any number of inputs greater than zero. For example, the illustration of FIG. 3 may not differ if a user performed the input gesture with one, two or three inputs. In other examples, user 3 may use more or fewer inputs to perform the example input gesture. As user 3 positions inputs at or near display 101, UI module 6 may detect input points 102. In some examples, gesture module 10 may determine a coordinate location for each of input points 102 and a time associated with each input point, such as time $t_1$. In some examples, gesture module 10 may output the determined coordinate locations and times to other components of example computing device 100, for example focal point module 12.

In some examples, focal point module 12 may determine the coordinate location of focal point 110 associated with the received coordinate and time data associated with input points 102. For example, focal point module 12 may receive coordinate and time data associated with input points 102 in a format such as $(x_1, y_1, t_1), (x_2, y_2, t_1)$, and $(x_3, y_3, t_1)$. In other examples, the time periods associated with each input point 102 may be different. Focal point module 12 may then determine focal point 110 by determining the average of each of input points' 102 coordinate locations. In some examples, focal point module 12 may associate a time or time range with determined focal point 110. An example representation of determining the coordinate location of a focal point is shown below.

$$FP_1 = \left( \frac{x_1 + x_2 + x_3}{3}, \frac{y_1 + y_2 + y_3}{3}, t_1 \right) \quad (1)$$

In the three input point example, if the gesture module 10 determines the coordinate locations of the input points 102 to be (1, 2), (−2, 3), and (0, −2), the focal point module 12 would determine the coordinate location of a focal point 110 to be (−0.33, 1). Focal point module 12 may also associate a time, such as time $t_1$, with the determined focal point coordinates. In some examples, focal point module 12 may output the determined focal point coordinates and associated time to other components of computing device 100.

In some examples, shape module 14 may determine circular shape 104 associated with received focal point 110 data. For example, shape module 14 may receive coordinate and time data associated with input points 102 and coordinate and time data associated with focal point 110. As an example, shape module 14 may receive coordinate and time data in a format such as $(x_1, y_1, t_1), (x_2, y_2, t_1)$, and $(x_3, y_3, t_1)$ for input points 102 and $(x_{fp1}, y_{fp1}, t_{fp1})$ for focal point 110. In at least one example, shape module 14 may determine radius length 106 associated with input points 102 and focal point 110. Shape module 14 may determine radius length 106 by determining the average distance between focal point 110 and each input point 102. A formula for determining the distance between two points is shown below.

$$\text{Distance} = \sqrt{(x_2 - x_1)^2 + (y_2 - y_3)^2} \quad (2)$$

Accordingly, shape module 14 may determine the distance between each input point 102 and focal point 110 by inserting $x_{fp1}$ in the equation for $x_1$, $y_{fp1}$ for $y_1$, the x and y coordinate of each input point 102 into the $x_2$ and $y_2$ variables in the equation. Continuing the three input point example from above, and using formula (2), the distance between focal point 110 [at location (−0.33, 1)] and the input point 102 at coordinate location (1, 2) is 1.67. The other distances are 2.60 and 3.07. Consequently, the determined radius length 106, which is the average distance between each input point 102 and the focal point 110, would be 2.45. In some examples, shape module 14 may determine circular shape 104 centered at focal point 110, where determined circular shape 104 has a radius equal to determined radius length 106. As shown in FIG. 3, not all input points 102 will lie perfectly on determined circular shape 104. Some input points 102 may lie inside determined circle 104 and some may lie outside of circle 104. In some examples, shape module 14 may associate a time, such as time $t_1$ with determined circular shape 104. As with other modules, shape module 14 may output the data, such as the determined average distance between input points 102 and focal point 110, determined radius length 106, and determined circular shape 104 centered at focal point 110, among other data, to other components of computing device 100.

In some examples, geometric property module 16 may determine a geometric property associated with received circular shape 104 data. For example, geometric property module 16 may receive coordinate and time data associated with input points 102, coordinate and time data associated with focal point 110, and/or other data such as the determined average distance between input points 102 and focal point 110, determined radius length 106, and determined circular shape 104 centered at focal point 110. Geometric property module 16 may determine a geometric property of circular shape 104. Some examples of geometric properties include the diameter, the circumference, and the area of circular shape 104. Continuing the three input point example, the diameter of circular shape 104 would be 4.9. The circumference of circular shape 104 would be 15.39. The area of circular shape 104 would be 18.86. As with other modules, geometric property module 16 may output data, such as any of the received or determined data, to other components of computing device 100.

As shown in FIG. 3, user 3 may perform a scale-up input gesture by moving inputs at or near display 101. For example, user 3 may begin a scale-up input gesture by placing inputs at or near display 101, such as at or near input points 102, at a first time $t_1$. User 3 may then move the inputs outward in an expanding motion, as indicated by arrows 112, such that computing device 100 may associate input points 122 with the inputs at a second time $t_2$. At the second time, $t_2$, the various modules described previously may perform similar functions and determine the coordinate locations and times associated with input points 122 and the coordinate location of a focal point, such as focal point 110, radius length 126, circular shape 124, and geometric properties all associated with a second time $t_2$. Various modules 6, 7, 8, 10, 12, 14, 16, 18, 22, and 24A-24N may output received or determined data to other components of computing device 100, including content scaling module 18.

In some examples, content scaling module 18 may determine differences between data associated with determined geometric properties. For example, content scaling module 18 may receive coordinate and time data associated with input points 102, coordinate and time data associated with focal point 110, and/or other data such as determined average distance between input points 102 and focal point 110, determined radius length 106, determined circular shape 104 centered at focal point 110, and determined geometric properties. In at least one example, content scaling module 18 may determine differences in geometric properties associated with time $t_1$ and time $t_2$. As shown in FIG. 3, the geometric properties of determined circular shape 104 associated with time $t_1$ and determined circular shape 124 associated with time $t_2$ differ. For example, it is apparent from FIG. 3 that determined circular shape 124 may have a larger diameter, circumference, and area than determined circular shape 104. In response to determining differences in geometric properties, content scaling module 18 may cause UI device 4 to scale-up graphical content, for example graphical objects 15 and 17, associated with GUI 30. In some examples, content scaling module 18 may only scale displayed graphical content if the difference in geometric properties is larger than a threshold.

An example result of the scale-up input gesture is depicted in GUI 35 where graphical object 15 and 17 are scaled-up from their sizes in GUI 30. In some examples, content scaling module 18 may cause UI device 4 to scale the displayed graphical content in a linear relation to the differences in geometric properties. In other examples, content scaling module 18 may cause UI device 4 to scale the displayed graphical content in a non-linear relation to the differences in geometric properties. In still other examples, content scaling module 18 may cause UI device 4 to scale the displayed graphical content in a linear or a non-linear relation to the differences in geometric properties based on other data. In at least one example, content scaling module 18 may output the determined differences in geometric properties to other components of computing device 100.

Figure 4:
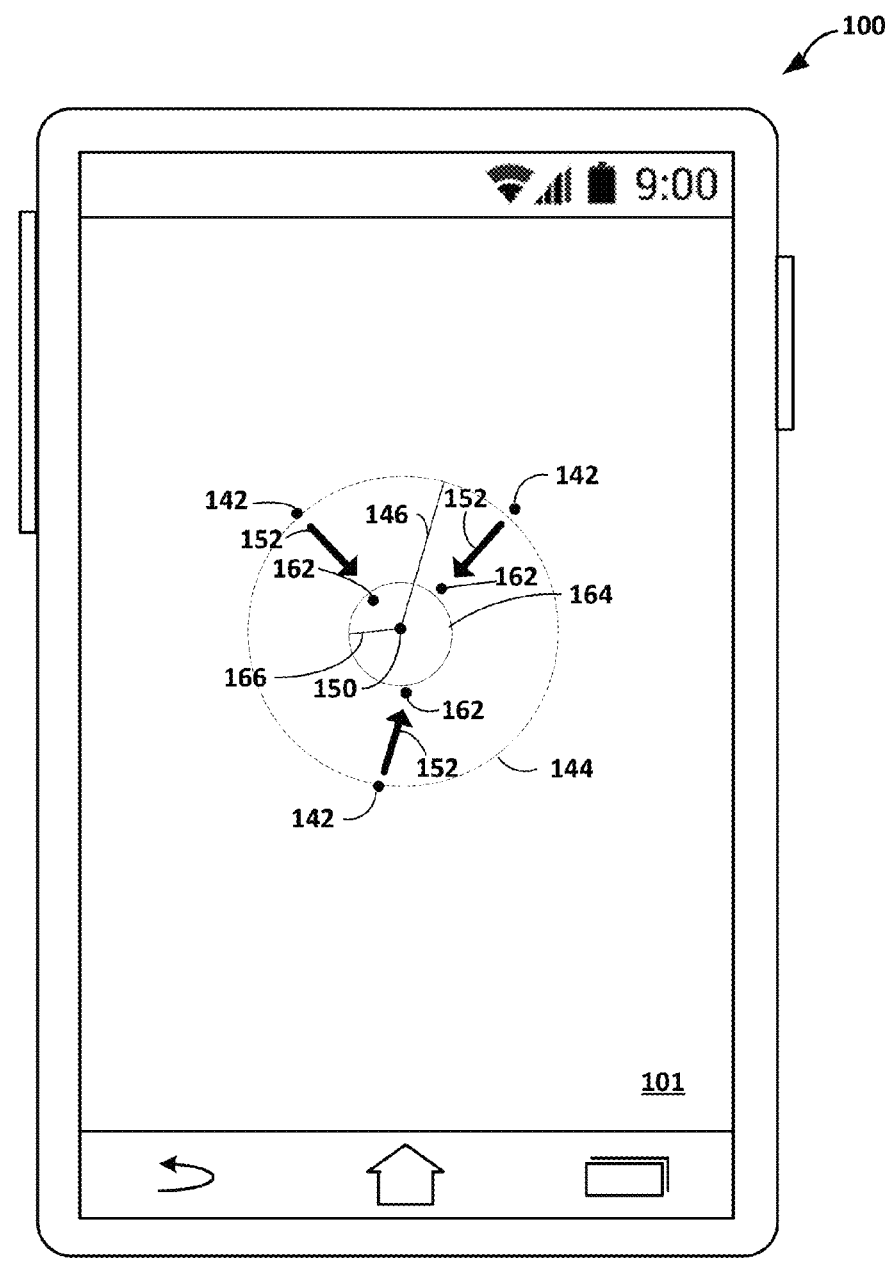
FIG. 4 is a conceptual diagram illustrating an example user interface that includes inputs for scaling information, in accordance with one or more aspects of the present disclosure.

FIG. 4 illustrates an example scale-down input gesture. The example techniques and modules described above to perform a scale-up input gesture are similar in a scale-down input gesture. However, the input points associated with a first time begin more widely apart and end at a second time more closely together. For example, gesture module 10, focal point module 12, shape module 14, and geometric property module 16 may associate input points 142, focal point 150, radius length 146, determined circular shape 144, and various geometric properties with a first time $t_1$. User 3 may move inputs in an inward manner in the direction of arrows 152. Gesture module 10, focal point module 12, shape module 14, and geometric property module 16 may further associate input points 162, radius length 166, determined circular shape 164, and various geometric properties with a second time period $t_2$. Accordingly, the geometric properties associated with time $t_2$ would be smaller than those associated with time $t_1$. Consequently, content scaling module 18 may cause UI device 4 to scale-down the displayed graphical content.

Figure 5:
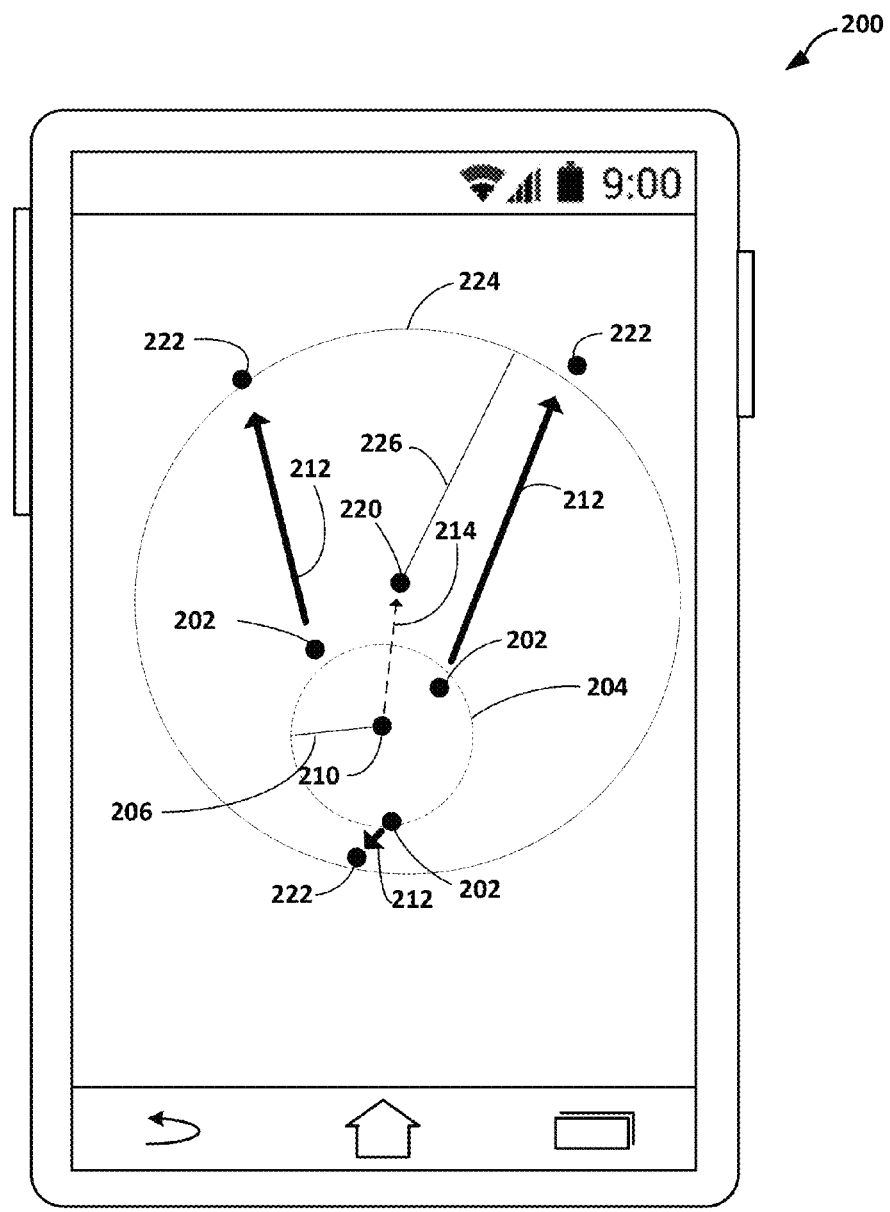
FIG. 5 is a conceptual diagram illustrating an example user interface that includes inputs for scaling and scrolling information, in accordance with one or more aspects of the present disclosure.

FIG. 5 is a conceptual diagram illustrating an example user interface that includes inputs for scaling and scrolling information, in accordance with one or more aspects of the present disclosure. The modules and techniques described previously all perform in a similar manner to scale up displayed graphical content. For example, gesture module 10, focal point module 12, shape module 14, and geometric property module 16 may determine coordinate locations of input points 202 and focal point 210, radius length 206, circular shape 204, and geometric properties all associated with a first time $t_1$. After a user moves user inputs in the direction indicated by arrows 212, gesture module 10, focal point module 12, shape module 14, and geometric property module 16 may also determine coordinate locations of input points 222 and focal point 220, radius length 226, circular shape 224, and geometric properties all associated with a second time $t_2$. FIG. 5 further illustrates an example situation where focal point 220 associated with time $t_2$ has a coordinate location different than focal point 210 associated with first time $t_1$. As illustrated in FIG. 5, and described previously, the scale-up input gesture may cause, through modules 6, 7, 8, 10, 12, 14, 16, 18, 22, and/or 24A-24N, UI device 4 to scale-up displayed graphical content.

In the example of FIG. 5, as described previously, scrolling module 22 may determine differences in coordinate locations of determined focal points. For example, scrolling module 22 may receive coordinate and time data associated with input points 202 and 222, coordinate and time data associated with focal points 210 and 220, and/or other data such as determined average distances between input points 202 or 222 and focal points 210 and 220, determined radius lengths 206 and 226, determined circular shapes 204 and 224, and determined geometric properties. In some examples, scrolling module 22 may determine differences in coordinate locations between a focal point associated with a time $t_1$ and a focal point associated with a time $t_2$. In the example of FIG. 5, focal point 210 is associated with time $t_1$ and focal point 220 is associated with time $t_2$ with the difference between the two points indicated by arrow 214. In response to determining a difference in coordinate locations of focal points, scrolling module 22 may cause UI device 4 to scroll the displayed graphical content in the direction of the movement of the focal point (as indicated by arrow 214). In some examples, scrolling module 22 may cause UI device 4 to scroll the displayed graphical content in a linear relation to the differences in focal point coordinate locations. In other examples, scrolling module 22 may cause UI device 4 to scroll the displayed graphical content in a non-linear relation to the differences in focal point coordinate locations. In still other examples, scrolling modules 22 may cause UI device 4 to scroll the displayed graphical content in a linear or a non-linear relation to the differences in focal point coordinate locations based on other data. In at least one example, scrolling module 22 may output the determined differences in focal point coordinate locations to other components of computing device 100.

Figure 6:
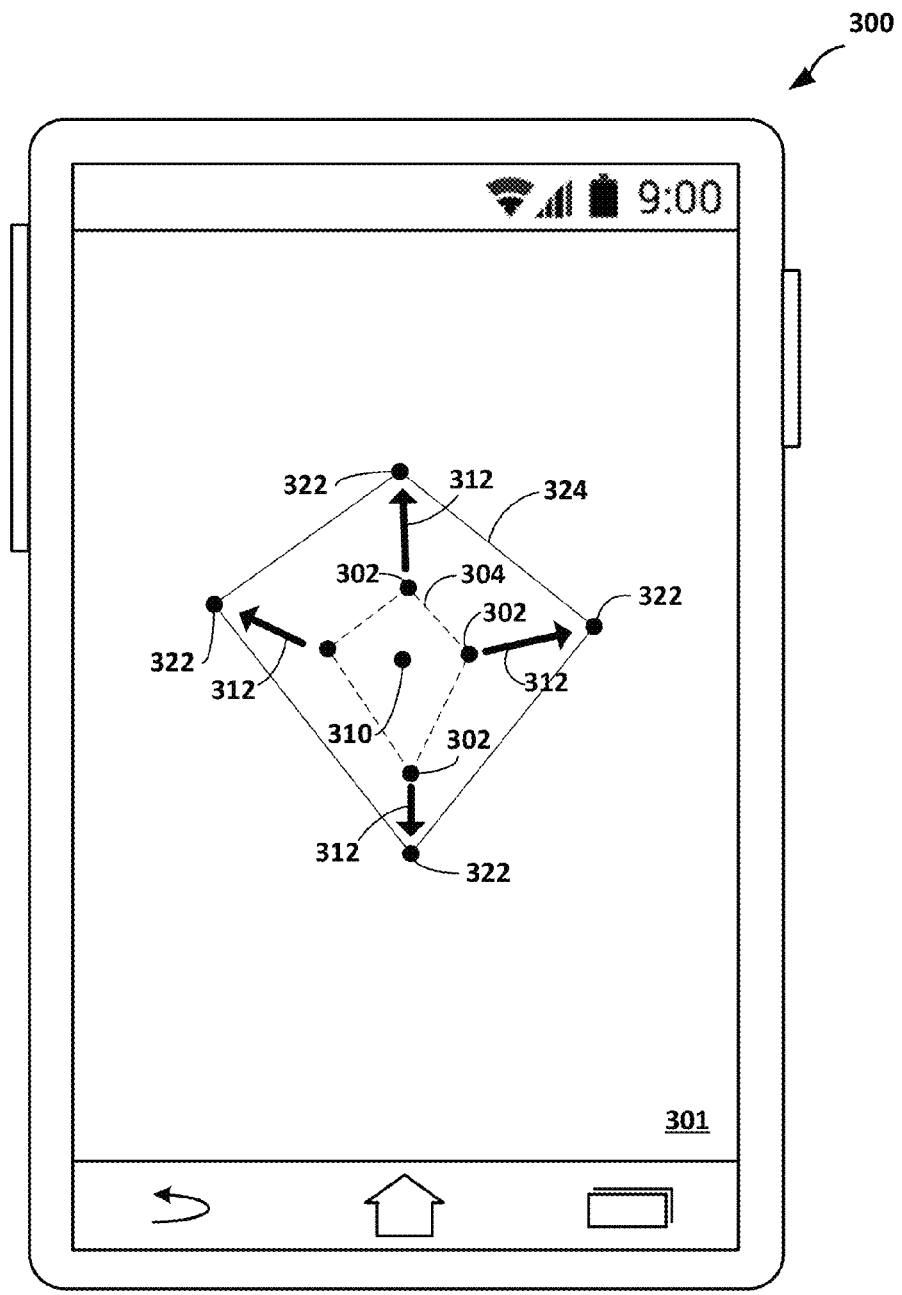
FIG. 6 is a conceptual diagram illustrating an example user interface that includes inputs for scaling information, in accordance with one or more aspects of the present disclosure.

FIG. 6 is a conceptual diagram illustrating an example user interface that includes inputs for scaling information, in accordance with one or more aspects of the present disclosure. FIG. 6 also illustrates example input points, such as input points 302 and 322, associated with a scaling input gesture. When an example user 3 performs a scaling input gesture, the user may place a number of inputs near or in contact with display 301. User 3 may then perform an input gesture by moving the inputs away from each other in an expanding motion.

FIG. 6 illustrates an example scale-up input gesture using four input points. Computing device 300 may associate input points 302 and 322 with the inputs involved in the scaling input gesture. As described previously, input points 302 and 322 may be associated with any number of inputs greater than zero. In general, various modules 6, 7, 8, 10, 12, 14, 16, 18, 22, and 24A-24N perform similar functions in the example of FIG. 6 as described above and as illustrated in FIGS. 3-5. For example, UI device 4 may detect inputs at or near display 301, gesture module 10 may determine coordinate locations of input points 302 associated with the inputs at a first time, such as time $t_1$, and focal point module 12 may determine a coordinate location of a focal point, such as focal point 310, associated with a first time $t_1$. In performing a scale-up input gesture, a user may move inputs in the direction indicated by arrows 312. At a second time, $t_2$, example gesture module 10 may determine coordinate locations of input points 342 associated with time $t_2$, and example focal point module 12 may determine a coordinate location of a focal point, such as point 310, associated with time $t_2$.

In contrast to previous examples, as illustrated in FIG. 6, example shape module 14 may determine a polygon shape instead of a circular shape. For example, at time $t_1$, shape module 14 may determine polygon shape 304 bounded by input points 302. At a second time, $t_2$, shape module 14 may determine polygon shape 324 bounded by input points 322. Consequently, example geometric property module 16 may determine geometric properties of the polygon shapes 304 and 324. Some example geometric properties include the area of the polygons 304 and 324, the square root of the area of the polygons 304 and 324, and the sum of the lengths of all of the sides of the polygons 304 and 324. Geometric property module 16 may associate determined geometric properties of a polygon 304 associated with a first time $t_1$ also with first time $t_1$. Likewise, geometric property module 16 may associate determined geometric properties of a polygon 324 associated with a second time $t_2$ also with second time $t_2$.

In some examples, content scaling module 18 may determine differences between data associated with determined geometric properties. For example, content scaling module 18 may receive data from other components of computing device 300 such as determined polygon shapes 304 and 324 and determined geometric properties. In some examples, content scaling module 18 may determine differences in geometric properties associated with times $t_1$ and time $t_2$. As shown in FIG. 6, the geometric properties of determined polygon shape 304 associated with time $t_1$ and determined polygon shape 324 associated with time $t_2$ differ. For example, it is apparent from FIG. 6 that determined polygon shape 324 may have a larger area, square root of area, or sum of lengths of all sides than determined polygon area 304. In response to determining differences in geometric properties, content scaling module 18 may cause UI device 4 to scale-up graphical content, such as graphical objects 15 and 17, associated with GUI 30. In some examples, content scaling module 18 may only scale displayed graphical content if the difference in geometric properties is larger than a threshold. An example result of the scale-up gesture is depicted in GUI 35 where graphical object 15 and 17 are scaled-up from their sizes in GUI 30. In at least one example, content scaling module 18 may cause UI device 4 to scale the displayed graphical content in a linear relation to the differences in geometric properties. In other examples, content scaling module 18 may cause UI device 4 to scale the displayed graphical content in a non-linear relation to the differences in geometric properties. In still other examples, content scaling modules 18 may cause UI device 4 to scale the displayed graphical content in a linear or a non-linear relation to the differences in geometric properties based on other data. In at least one example, content scaling module 18 may output the determined differences in geometric properties to other components of computing device 300.

Figure 7:
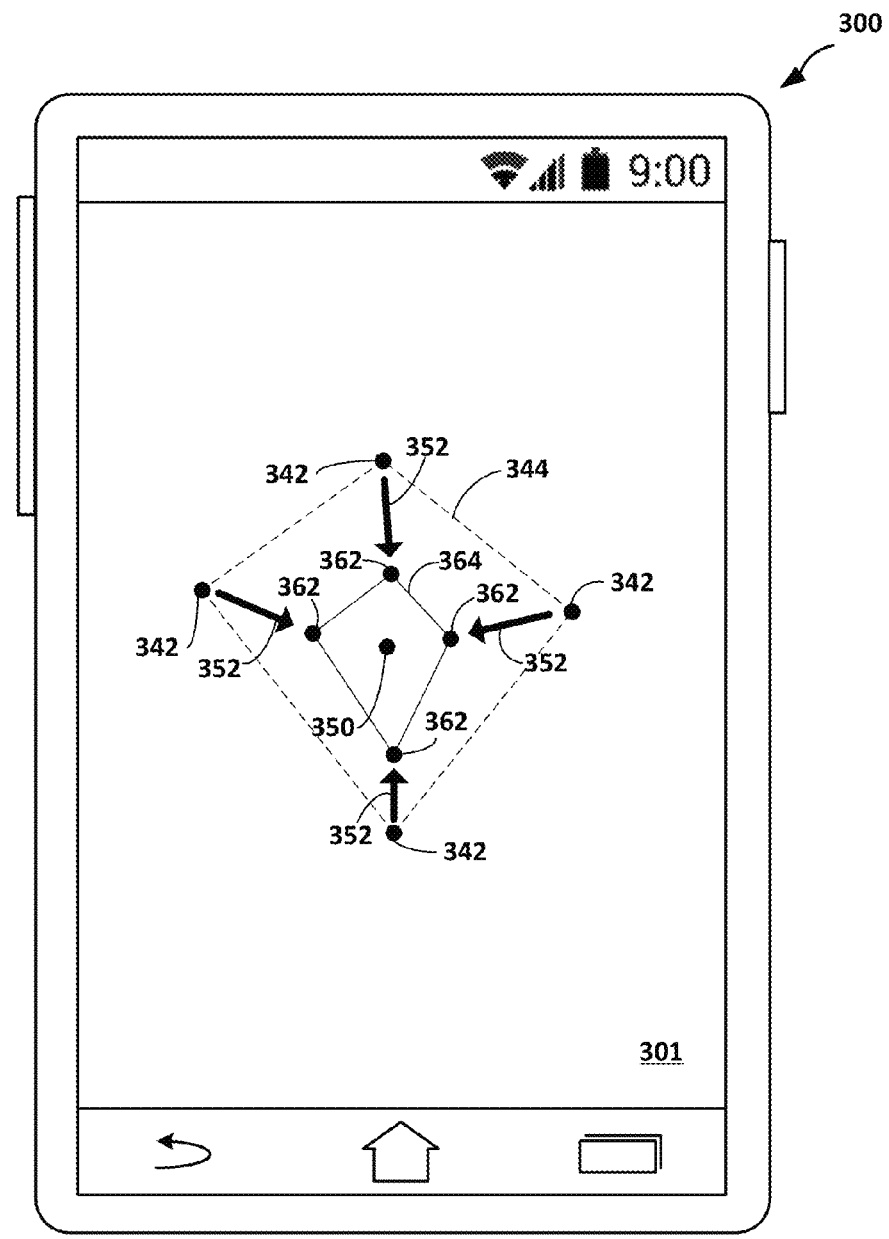
FIG. 7 is a conceptual diagram illustrating an example user interface that includes inputs for scaling information, in accordance with one or more aspects of the present disclosure.

FIG. 7 illustrates an example scale-down input gesture performed with four inputs. The example techniques and modules described above relating to a scale-up input gesture are similar in a scale-down input gesture. However, the input points associated with a first time begin more widely apart and end at a second time more closely together. For example, gesture module 10, focal point module 12, shape module 14, and geometric property module 16 may associate input points 342, focal point 350, determined polygon shape 344, and various geometric properties with a first time $t_1$. User 3 may move inputs in an inward manner in the direction of arrows 352. Gesture module 10, focal point module 12, shape module 14, and geometric property module 16 may further associate input points 362, a focal point, such as focal point 350, determined polygon shape 364, and various geometric properties with a second time period $t_2$. Accordingly, the geometric properties associated with time $t_2$ would be smaller than those associated with time $t_1$. Consequently, content scaling module 18 may cause UI device 4 to scale-down the displayed graphical content.

Figure 8:
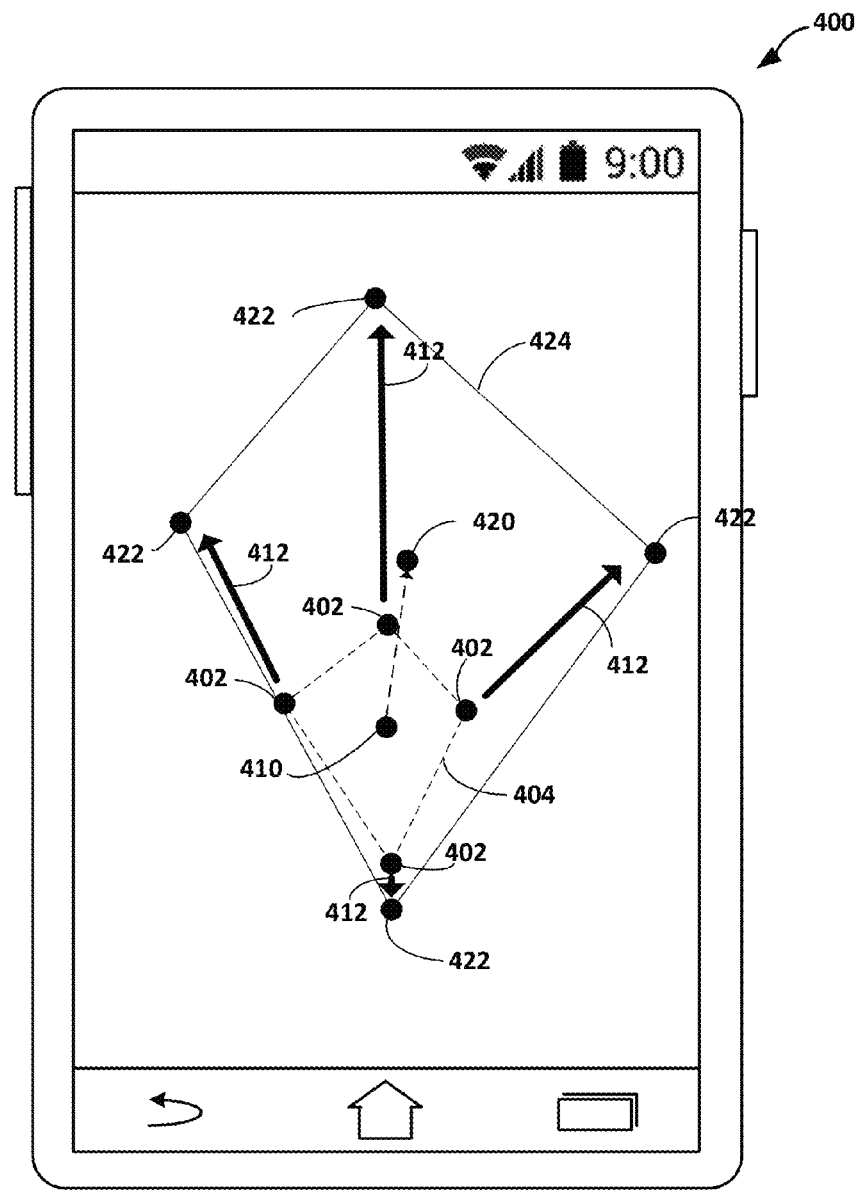
FIG. 8 is a conceptual diagram illustrating an example user interface that includes inputs for scaling and scrolling content, in accordance with one or more aspects of the present disclosure.

FIG. 8 is a conceptual diagram illustrating an example user interface that includes inputs for scaling and scrolling content, in accordance with one or more aspects of the present disclosure. The modules and techniques described previously all perform in a similar manner to scale up displayed graphical content. For example, gesture module 10, focal point module 12, shape module 14, and geometric property module 16 may determine coordinate locations of input points 402 and focal point 410, polygon shape 404, and geometric properties all associated with a first time $t_1$. After a user moves inputs in the direction indicated by arrows 412, gesture module 10, focal point module 12, shape module 14, and geometric property module 16 may also determine coordinate locations of input points 422 and focal point 420, polygon shape 424, and geometric properties all associated with a second time $t_2$. FIG. 8 further illustrates an example situation where focal point 420 associated with time $t_2$ has a coordinate location different than focal point 410 associated with first time $t_1$. As illustrated in FIG. 8, and described previously, the scale-up input gesture may cause, through modules 6, 7, 8, 10, 12, 14, 16, 18, 22, and/or 24A-24N, UI device 4 to scale-up displayed graphical content.

As described previously, scrolling module 22 may determine differences in coordinate locations of determined focal points. In the example of FIG. 8, scrolling module 22 may perform similarly as previously described in the three input example. Accordingly, in some examples, scrolling module 22 may determine differences in coordinate locations between a focal point associated with a time $t_1$ and a focal point associated with a time $t_2$. For example, as illustrated in FIG. 8, focal point 410 is associated with time $t_1$ and focal point 420 is associated with time $t_2$ with the difference between the two points indicated by arrow 414. In response to determining a difference in coordinate locations of focal points, scrolling module 22 may cause UI device 4 to scroll the displayed graphical content in the direction of the movement of the focal point (as indicated by arrow 214). In some examples, scrolling module 22 may cause UI device 4 to scroll the displayed graphical content in a linear relation to the differences in focal point coordinate locations. In other examples, scrolling module 22 may cause UI device 4 to scroll the displayed graphical content in a non-linear relation to the differences in focal point coordinate locations. In still other examples, scrolling module 22 may cause UI device 4 to scroll the displayed graphical content in a linear or a non-linear relation to the differences in focal point coordinate locations based on other data. In at least one example, scrolling module 22 may output the determined differences in focal point coordinate locations to other components of computing device 100.

Figure 9:
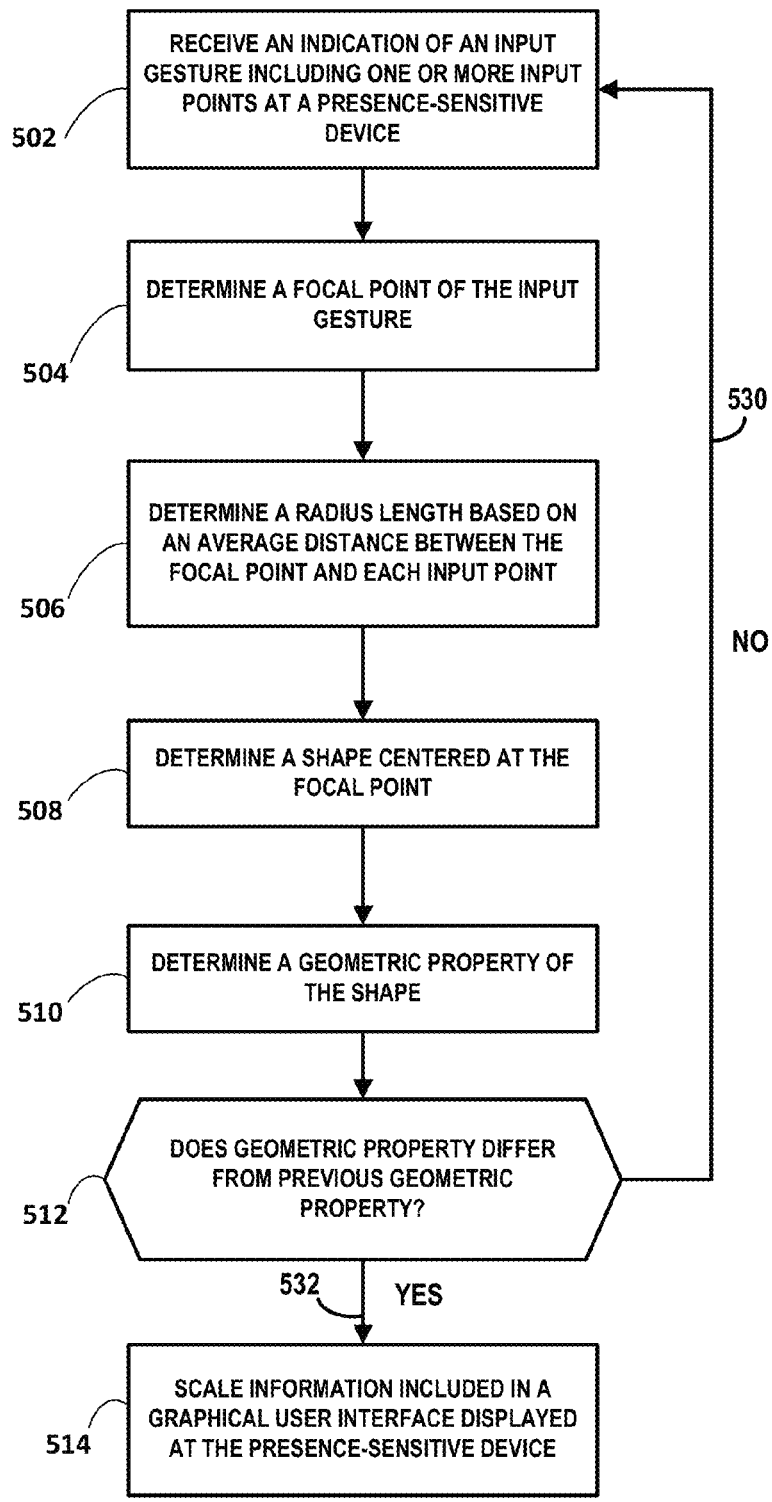
FIG. 9 is a flow diagram illustrating an example operation of a computing device for scaling information included within a user interface, in accordance with one or more techniques of the present disclosure.

FIG. 9 is a flow diagram illustrating an example operation of a computing device for scaling information included within a user interface, in accordance with one or more techniques of the present disclosure.

In the example of FIG. 9, computing device 2 may initially receive an indication of an input gesture including one or more input points at a presence-sensitive input device (502). Computing device 2 may subsequently determine a focal point of the input gesture (504). Computing device 2 may further determine a radius length based on an average distance between the focal point and each input point (506). Computing device 2 may subsequently determine a shape centered at the focal point (508). Computing device 2 may further determine a geometric property of the shape (510). In response to determining a geometric property of the shape, computing device 2 may determine whether the geometric property differs from a previous geometric property (512). If the geometric property does not differ, or does not differ by a threshold amount, computing device 2 may ignore the input gesture or perform some other action not related to techniques of this disclosure (530). If the geometric property has changed (532), computing device 2 may scale information included in a graphical user interface displayed at the presence-sensitive input device (514).

In one example, the determined shape comprises a circle. In another example, the geometric property comprises a diameter of a circle. In one example, the geometric property comprises an area of the circle. In another example, the geometric property comprises a circumference of a circle. In one example, the scaling of the information included in the graphical user interface displayed at the presence-sensitive input device is linearly based on the change in the geometric property. In another example, the scaling of the information included in the graphical user interface displayed at the presence-sensitive input device is non-linearly based on the change in the geometric property.

In one example, the operations include determining focal point location changes and scrolling the information included in the graphical user interface displayed at the presence-sensitive input device in the direction of the change in focal point location. In another example, the scrolling of the information included in the graphical user interface displayed at the presence-sensitive input device is linearly based on the change in the geometric property. In one example, the scrolling of the information included in the graphical user interface displayed at the presence-sensitive input device is non-linearly based on the change in the geometric property.

Figure 10:
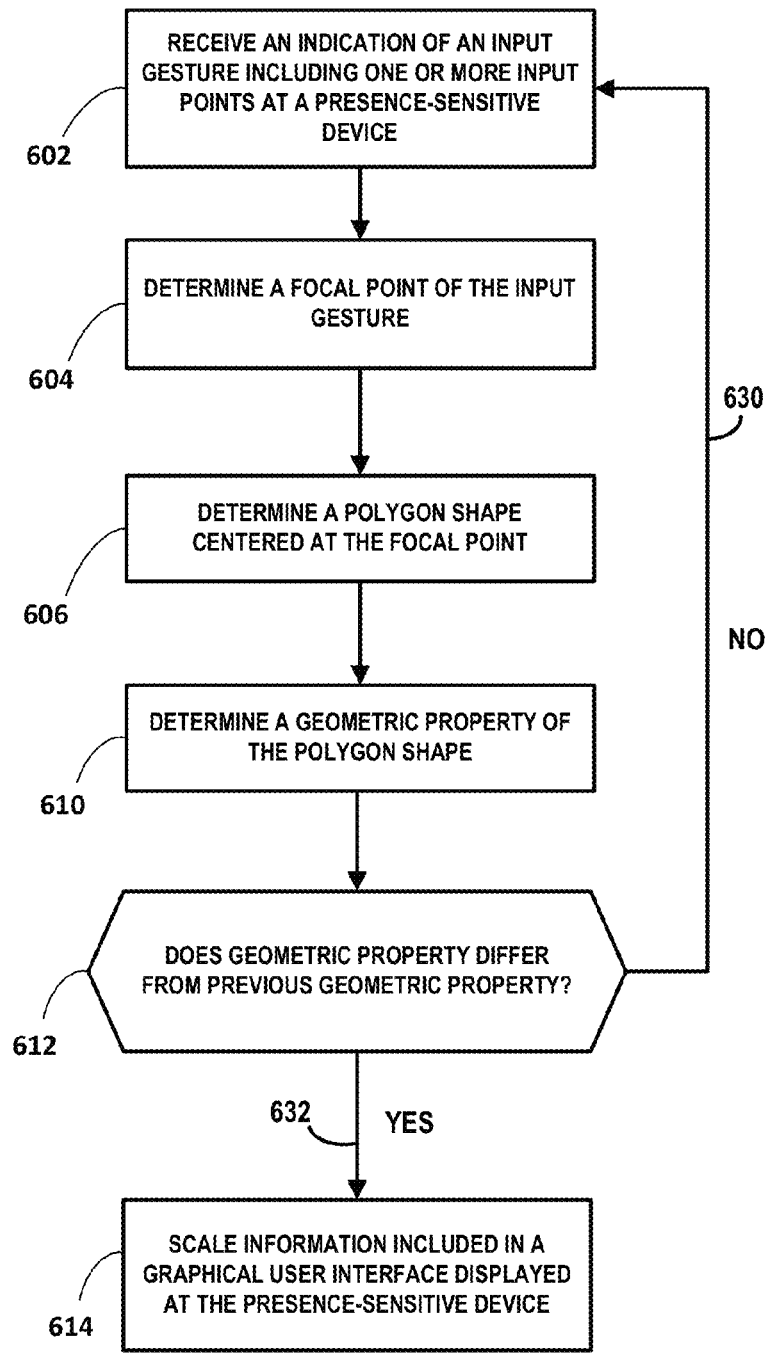
FIG. 10 is a flow diagram illustrating an example operation of a computing device for scaling information included within a user interface, in accordance with one or more techniques of the present disclosure.

FIG. 10 is a flow diagram illustrating an example operation of a computing device for scaling information included within a user interface, in accordance with one or more techniques of the present disclosure.

In the example of FIG. 10, computing device 2 may initially receive an indication of an input gesture including one or more input points at a presence-sensitive input device (602). Computing device 2 may subsequently determine a focal point of the input gesture (604). Computing device 2 may further determine a polygon shape centered at the focal point (606). Computing device 2 may further determine a geometric property of the polygon shape (610). In response to determining a geometric property of the shape, computing device 2 may determine whether the geometric property differs from a previous geometric property (612). If the geometric property does not differ, or does not differ by a threshold amount, computing device 2 may ignore the input gesture or perform some other action not related to techniques of this disclosure (630). If the geometric property has changed (632), computing device 2 may scale information included in a graphical user interface displayed at the presence-sensitive input device (614).

In one example, the geometric property comprises an area of a polygon shape. In another example, the geometric property comprises a square root of an area of a polygon shape. In one example, the geometric property comprises a sum of the lengths of all of the sides of a polygon shape. In another example, the scaling of the information included in the graphical user interface displayed at the presence-sensitive input device is linearly based on the change in the geometric property. In another example, the scaling of the information included in the graphical user interface displayed at the presence-sensitive input device is non-linearly based on the change in the geometric property.

In one example, the operations include determining focal point location changes and scrolling the information included in the graphical user interface displayed at the presence-sensitive input device in the direction of the change in focal point location. In another example, the scrolling of the information included in the graphical user interface displayed at the presence-sensitive input device is linearly based on the change in the geometric property. In one example, the scrolling of the information included in the graphical user interface displayed at the presence-sensitive input device is non-linearly based on the change in the geometric property.

Figure 11:
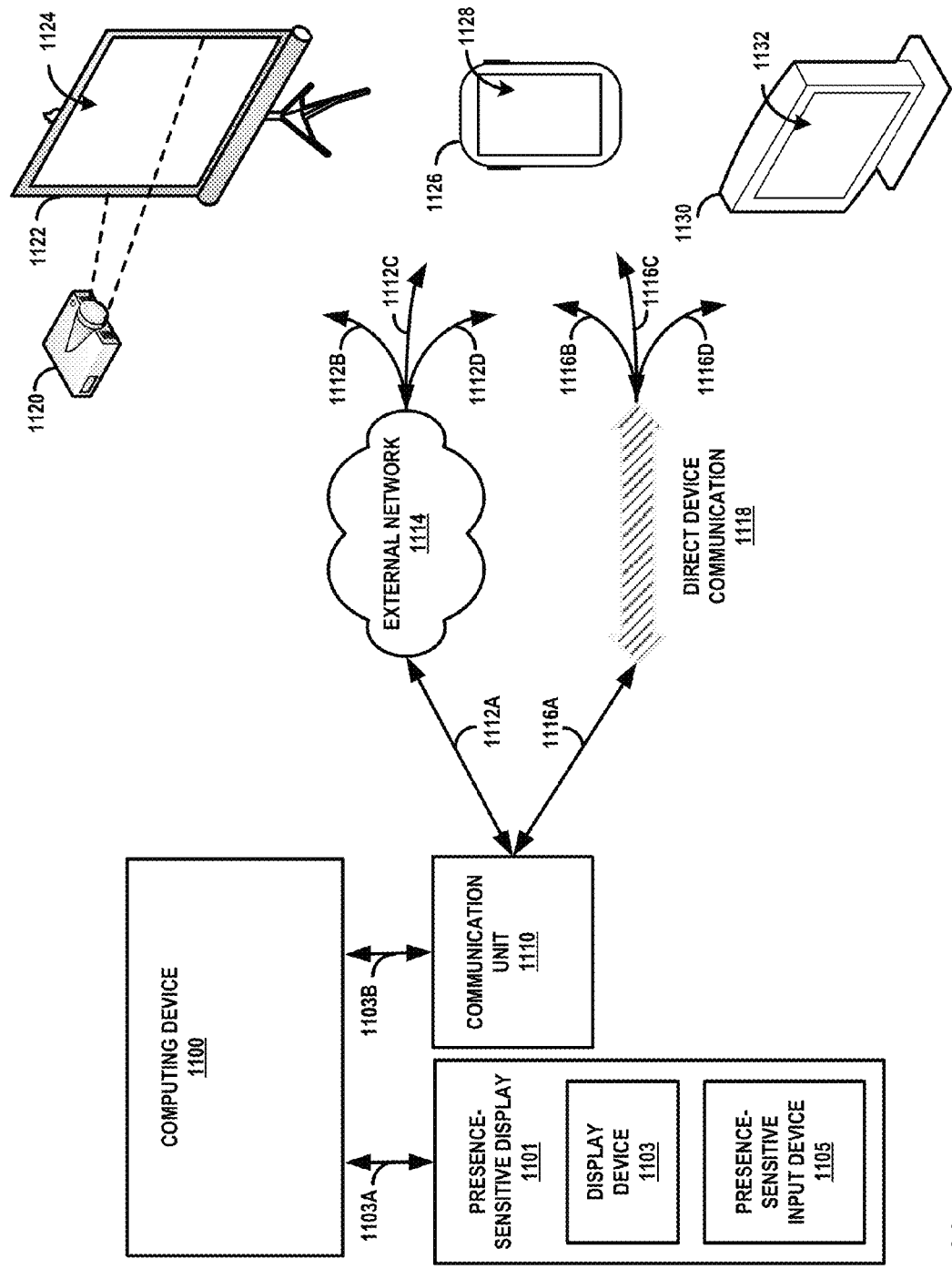
FIG. 11 is a block diagram illustrating multiple computing devices and display devices in a distributed system for scaling information displayed on a user interface of one or more devices, in accordance with one or more techniques of the present disclosure.

FIG. 11 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 11 includes a computing device 1100, presence-sensitive display 1101, communication unit 1110, projector 1120, projector screen 1122, tablet device 1126, and visual display device 1130. Although shown for purposes of example in FIGS. 1 and 2 as a stand-alone computing device 1100, a computing-device may, generally, be any component or system that includes a processor or other suitable computing environment for executing software instructions and, for example, need not include a presence-sensitive display.

As shown in the example of FIG. 11, computing device 1100 may be a processor that includes functionality as described with respect to processor 40 in FIG. 2. In such examples, computing device 1100 may be operatively coupled to presence-sensitive display 1101 by a communication channel 1103A, which may be a system bus or other suitable connection. Computing device 1100 may also be operatively coupled to communication unit 1110, further described below, by a communication channel 1103B, which may also be a system bus or other suitable connection. Although shown separately as an example in FIG. 11, computing device 1100 may be operatively coupled to presence-sensitive display 1101 and communication unit 1110 by any number of one or more communication channels.

In other examples, such as illustrated previously in FIGS. 1-2, computing device 1100 may be a portable or mobile device such as mobile phones (including smart phones), laptop computers, etc. In some examples, computing device 1100 may be a desktop computers, tablet computers, smart television platforms, cameras, personal digital assistants (PDAs), servers, mainframes, etc.

Presence-sensitive display 1101, as shown in FIG. 1, may include display device 1103 and presence-sensitive input device 1105. Display device 1103 may, for example, receive data from computing device 1100 and display the graphical content. In some examples, presence-sensitive input device 1105 may determine one or more user inputs (e.g., continuous gestures, multi-touch gestures, single-touch gestures, etc.) at presence-sensitive display 1101 using capacitive, inductive, and/or optical recognition techniques and send indications of such user input to computing device 1100 using communication channel 1103A. In some examples, presence-sensitive input device 1105 may be physically positioned on top of display device 1103 such that, when a user positions an input unit over a graphical element displayed by display device 1103, the location at which presence-sensitive input device 1105 corresponds to the location of display device 1103 at which the graphical element is displayed.

As shown in FIG. 11, computing device 1100 may also include and/or be operatively coupled with communication unit 1110. Communication unit 1110 may include functionality of communication unit 44 as described in FIG. 2. Examples of communication unit 1110 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 1100 may also include and/or be operatively coupled with one or more other devices, e.g., input devices, output devices, memory, storage devices, etc. that are not shown in FIG. 11 for purposes of brevity and illustration.

FIG. 11 also illustrates a projector 1120 and projector screen 1122. Other such examples of projection devices may include electronic whiteboards, holographic display devices, and any other suitable devices for displaying graphical content. Projector 1120 and project screen 1122 may include one or more communication units that enable the respective devices to communicate with computing device 1100. In some examples, the one or more communication units may enable communication between projector 1120 and projector screen 1122. Projector 1120 may receive data from computing device 1100 that includes graphical content. Projector 1120, in response to receiving the data, may project the graphical content onto projector screen 1122. In some examples, projector 1120 may determine one or more user inputs (e.g., continuous gestures, multi-touch gestures, single-touch gestures, etc.) at projector screen using optical recognition or other suitable techniques and send indications of such user input using one or more communication units to computing device 1100.

Projector screen 1122, in some examples, may include a presence-sensitive display 1124. Presence-sensitive display 1124 may include a subset of functionality or all of the functionality of UI device 4 as described in this disclosure. In some examples, presence-sensitive display 1124 may include additional functionality. Projector screen 1122 (e.g., an electronic whiteboard), may receive data from computing device 1100 and display the graphical content. In some examples, presence-sensitive display 1124 may determine one or more user inputs (e.g., continuous gestures, multi-touch gestures, single-touch gestures, etc.) at projector screen 1122 using capacitive, inductive, and/or optical recognition techniques and send indications of such user input using one or more communication units to computing device 1100.

FIG. 11 also illustrates tablet device 1126 and visual display device 1130. Tablet device 1126 and visual display device 1130 may each include computing and connectivity capabilities. Examples of tablet device 1126 may include e-reader devices, convertible notebook devices, hybrid slate devices, etc. Examples of visual display device 1130 may include televisions, computer monitors, etc. As shown in FIG. 11, tablet device 1126 may include a presence-sensitive display 1128. Visual display device 1130 may include a presence-sensitive display 1132. Presence-sensitive displays 1128, 1132 may include a subset of functionality or all of the functionality of UI device 4 as described in this disclosure. In some examples, presence-sensitive displays 1128, 1132 may include additional functionality. In any case, presence-sensitive display 1132, for example, may receive data from computing device 1100 and display the graphical content. In some examples, presence-sensitive display 1132 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 1100.

As described above, in some examples, computing device 1100 may output graphical content for display at presence-sensitive display 1101 that is coupled to computing device 1100 by a system bus or other suitable communication channel. Computing device 1100 may also output graphical content for display at one or more remote devices, such as projector 1120, projector screen 1122, tablet device 1126, and visual display device 1130. For instance, computing device 1100 may execute one or more instructions to generate and/or modify graphical content in accordance with techniques of the present disclosure. Computing device 1100 may output the data that includes the graphical content to a communication unit of computing device 1100, such as communication unit 1110. Communication unit 1110 may send the data to one or more of the remote devices, such as projector 1120, projector screen 1122, tablet device 1126, and/or visual display device 1130. In this way, computing device 1100 may output the graphical content for display at one or more of the remote devices. In some examples, one or more of the remote devices may output the graphical content at a presence-sensitive display that is included in and/or operatively coupled to the respective remote devices.

In some examples, computing device 1100 may not output graphical content at presence-sensitive display 1101 that is operatively coupled to computing device 1100. In other examples, computing device 1100 may output graphical content for display at both a presence-sensitive display 1101 that is coupled to computing device 1100 by communication channel 1103A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 1100 and output for display at presence-sensitive display 1101 may be different than graphical content display output for display at one or more remote devices.

Computing device 1100 may send and receive data using any suitable communication techniques. For example, computing device 1100 may be operatively coupled to external network 1114 using network link 1112A. Each of the remote devices illustrated in FIG. 11 may be operatively coupled to network external network 1114 by one of respective network links 1112B, 1112C, and 1112D. External network 1114 may include network hubs, network switches, network routers, etc., that are operatively inter-coupled thereby providing for the exchange of information between computing device 1100 and the remote devices illustrated in FIG. 11. In some examples, network links 1112A-1112D may be Ethernet, ATM or other network connections. Such connections may be wireless and/or wired connections.

In some examples, computing device 1100 may be operatively coupled to one or more of the remote devices included in FIG. 11 using direct device communication 1118. Direct device communication 1118 may include communications through which computing device 1100 sends and receives data directly with a remote device, using wired or wireless communication. That is, in some examples of direct device communication 1118, data sent by computing device 1100 may not be forwarded by one or more additional devices before being received at the remote device, and vice-versa. Examples of direct device communication 1118 may include Bluetooth, Near-Field Communication, Universal Serial Bus, WiFi, infrared, etc. One or more of the remote devices illustrated in FIG. 11 may be operatively coupled with computing device 1100 by communication links 1116A-1116D. In some examples, communication links 1112A-1112D may be connections using Bluetooth, Near-Field Communication, Universal Serial Bus, infrared, etc. Such connections may be wireless and/or wired connections.

In accordance with techniques of the disclosure, computing device 1100 may be operatively coupled to visual display device 1130 using external network 1114. Computing device 1100 may output information or data, such as text, images, graphical objects, or the like for display at presence-sensitive display 1132. For instance, computing device 1100 may send information or data that includes a representation of a webpage to communication unit 1110. Communication unit 1110 may send the information or data that includes the representation of the webpage to visual display device 1130 using external network 1114. Visual display device 1130, in response to receiving the information or data using external network 1114, may cause presence-sensitive display 1132 to output the webpage. In response to a user performing a gesture at presence-sensitive display 1132, such as to scale up or scale down information or data output by presence-sensitive display 1132 visual display device 1130 may send an indication of the gesture to computing device 1100 using external network 1114. Communication unit 1110 of may receive the indication of the gesture, and send the indication to computing device 1100.

Computing device 1100 may determine the input points of the inputs positioned at or near presence-sensitive display 1132 and the movement of the input points. Based on the input points and their movement, computing device 1100 may scale the information or data displayed at presence-sensitive display 1132. For instance, if the input points move away from each other, according to the techniques previously described, computing device 1100 may scale up the information or data displayed presence-sensitive display 1132. Computing device 1100 may then send the scaled up information or data, or in some cases a command to scale-up, to communication unit 1110, which in turn may send the information, data, or command to visual display device 1130 using external network 1114. Upon receiving the information, data, or command, visual display device 1130 may cause presence-sensitive display 1132 to display the information or data at a scaled-up size. In this way, computing device 1100 may output the output the scaled-up information or data, or a scale-up command, to visual display device 1130, in accordance with techniques of this disclosure.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

What is claimed is:

1. A method comprising:
    receiving, by a computing device, an indication of an input gesture detected at a presence-sensitive input device, the input gesture including three or more input points, each input point being detected at a respective location of the presence-sensitive input device;
    determining, by the computing device and based on an average of coordinates of each of the three or more input points, a coordinate location of a focal point of the input gesture;
    determining, by the computing device, a polygon shape substantially centered at the coordinate location of the focal point, the polygon shape having a size determined based on the respective input points; and
    responsive to determining that a geometric property of the polygon shape has changed, outputting, by the computing device, a scaled version of information included in a graphical user interface, the scaled version of the information being based on the change in the geometric property and centered at the coordinate location of focal point.

2. The method of claim 1, wherein the geometric property comprises one of an area of the polygon shape, a square root of an area of the polygon shape, or a sum of the lengths of all of the sides of the polygon shape.

3. The method of claim 1, wherein the scaling of the information included in the graphical user interface displayed at the display device is linearly based on the change in the geometric property.

4. The method of claim 1, wherein the scaling of the information included in the graphical user interface displayed at the display device is non-linearly based on the change in the geometric property.

5. The method of claim 1, further comprising:
    responsive to determining that the coordinate location of the focal point of the input gesture changes, scrolling, based on the change in the coordinate location of the focal point of the input gesture, information included in the graphical user interface displayed at the display device, the scrolling of the information being in the direction of the change in the coordinate location of the focal point.

6. The method of claim 5, wherein the scrolling of the information included in the graphical user interface displayed at the display device is linearly based on the change in the coordinate location of the focal point.

7. The method of claim 5, wherein the scrolling of the information included in the graphical user interface displayed at the display device is non-linearly based on the change in the coordinate location of the focal point.

8. A system comprising:
a display device;
a presence-sensitive input device;
at least one processor that is operatively coupled to the presence-sensitive input device; and
at least one module operable by the at least one processor to:
receive an indication of an input gesture detected at the presence-sensitive input device, the input gesture including three or more input points, each input point being detected at a respective location of the presence-sensitive input device;
determine, based on an average of coordinates of each of the three or more input points, a coordinate location of a focal point of the input gesture;
determine, based on an average distance between the coordinate location of the focal point and each of the respective input points, a radius length;
determine a circle substantially centered at the coordinate location of the focal point, the circle having a size determined based on the radius length; and
responsive to determining that a geometric property of the circle has changed, output a scaled version of information included in a graphical user interface, the scaled version of the information being based on the change in the geometric property and centered at the coordinate location of the focal point.

9. The method of claim 1, wherein the polygon shape is bounded by the respective input points.

10. The system of claim 8, wherein the scaling of the information included in the graphical user interface is non-linearly based on the change in the geometric property.

11. The system of claim 8, wherein the scaling of the information included in the graphical user interface is linearly based on the change in the geometric property.

12. The system of claim 8, wherein the geometric property comprises one of an area of the polygon shape, a square root of an area of the polygon shape, or a sum of the lengths of all of the sides of the polygon shape.

13. The system of claim 8, wherein, responsive to determining that the coordinate location of the focal point of the input gesture changes, the at least one module is further operable by the at least one processor to:
scroll, based on the change in the coordinate location of the focal point of the input gesture, information included in the graphical user interface displayed at the display device, the scrolling of the information being in the direction of the change in the coordinate location of the focal point.

14. The system of claim 13, wherein the scrolling of the information included in the graphical user interface displayed at the display device is linearly based on the change in the coordinate location of the focal point.

15. The system of claim 13, wherein the scrolling of the information included in the graphical user interface displayed at the display device is non-linearly based on the change in the coordinate location of the focal point.

16. The system of claim 8, wherein the polygon shape is bounded by the respective input points.

17. A non-transitory computer-readable storage medium storing instructions that, when executed, cause one or more processors of a computing device to:
receive an indication of an input gesture detected at a presence-sensitive input device, the input gesture including three or more input points, each input point being detected at a respective location of the presence-sensitive input device;
determine, based on an average of coordinates of each of the three or more input points, a coordinate location of a focal point of the input gesture;
determine a polygon shape substantially centered at the coordinate location of the focal point, the polygon shape having a size determined based on the respective input points; and
responsive to determining that a geometric property of the polygon shape has changed, output a scaled version of information included in a graphical user interface, the scaled version of the information being based on the change in the geometric property and centered at the coordinate location of focal point.

18. The non-transitory computer-readable storage medium of claim 17, wherein the scaling of the information included in the graphical user interface is non-linearly based on the change in the geometric property.

19. The non-transitory computer-readable storage medium of claim 17, wherein the scaling of the information included in the graphical user interface is linearly based on the change in the geometric property.

20. The non-transitory computer-readable storage medium of claim 17, wherein the geometric property comprises one of an area of the polygon shape, a square root of an area of the polygon shape, or a sum of the lengths of all of the sides of the polygon shape.

* * * * *